April 12, 1960     W. P. TER HORST     2,932,158
METHOD OF INITIATING THE COMBUSTION OF LIQUID HYDROCARBON FUELS
Filed Sept. 12, 1955
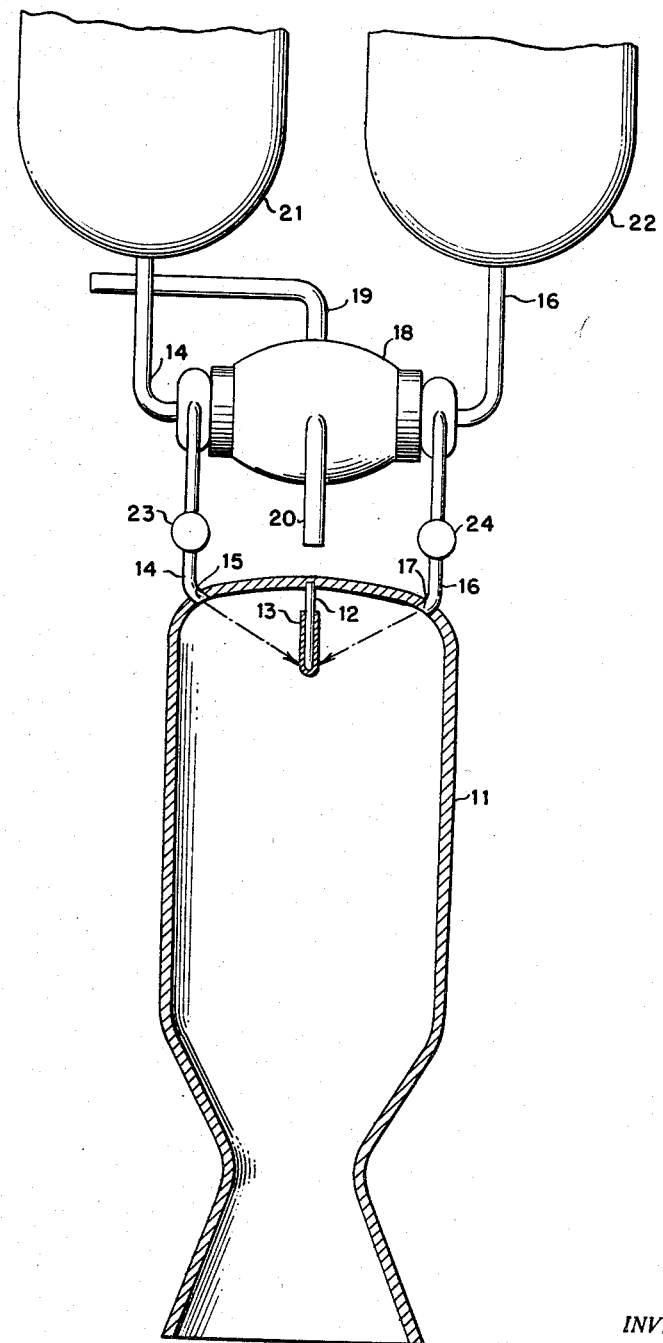
INVENTOR.
William P. TerHorst
BY
ATTORNEYS

United States Patent Office 2,932,158
Patented Apr. 12, 1960

2,932,158

METHOD OF INITIATING THE COMBUSTION OF LIQUID HYDROCARBON FUELS

William P. Ter Horst, McDonogh, Md., assignor to Olin Mathieson Chemical Corporation, a corporation of Virginia Application September 12, 1955, Serial No. 533,706

9 Claims. (Cl. 60—35.4)

My invention relates to compounds useful for their hypergolic action with oxidizing reagents and the use of such compounds in the ignition of propellent injected into reaction motor combustion systems.

This application is a continuation-in-part of my application Serial No. 301,998 filed July 31, 1952, now abandoned.

The principal elements of bi-propellent rocket motors of the type now in use for rocket propulsion or to give an accelerated take-off or accelerated speeds to airplanes utilize a liquid oxidizer and a liquid fuel and comprise a suitable housing, a combustion chamber, an exhaust nozzle, a propellent injection system including inlet orifices for fuel and oxidizer and suitable control valves for regulating the flow of oxidizer and fuel. The combustion chamber can be provided with a cooling system, for example, a jacket through which the fuel is pumped before injection into the combustion chamber. The rate of flow of the fuel and oxidizer into the combustion chamber and the ratio between the two are governed by the cross-sectional areas of the respective injection orifices and the differential pressures acting across them. In place of orifices, spray type injectors can be used.

The liquid fuel, e.g. kerosene, gasoline, benzene or other liquid hydrocarbon fuel, and the liquid oxidizing agent, especially red or white fuming nitric acid, are pumped into the combustion chamber where they ignite to produce combustion products. The combustion of these materials creates a mass of hot, burning gases which are forcibly ejected at high velocity from the combustion chamber through a suitable orifice or nozzle. The reaction from this ejection provides the thrust which propels the rocket. Such motors are of great potential value in assisting the take-off of seaplanes, since additional power is needed to overcome the skin friction of the water against the hulls of such planes. They are also of great value in assisting the take-off of heavily loaded land planes, since it is well known that only a fraction of the power in a modern air plane is used in flight, as compared with that necessary to lift the plane from the ground under ordinary take-off conditions.

Especially when the rocket is used to assist the take-off of airplanes, it is of utmost importance for the rocket fuel and oxidizer to ignite immediately and with certainty, as the plane would almost certainly crash if the rocket motor failed to fire. For this reason instantaneous ignition of the fuel by the oxidizer is essential. With some fuels a slight delay occurs after the reactants mix and before flaming combustion starts. During this interval additional fuel and oxidizing agents are pumped into the chamber and, when ignition does occur, the accumulated fuel and oxidizing agents may react explosively. This can result in damage to the rocket or rigging in which it is supported, other auxiliary equipment or personnel and is wasteful of fuel and oxidant. It is obviously desirable for combustion to start immediately on mixing the fuel and oxidizing agent to avert a disrupt, damaging start. Preferably, the ignition delay should be less than about 10 milliseconds.

I have found that contacting azines of certain unsaturated aldehydes, e.g. furfuralazine and acroleinazine, with an oxidizing agent, e.g. fuming nitric acid, spontaneously and instantly produces flaming combustion. Moreover, I have found that a hypergolic system consisting of these compounds can be used to produce instantaneous combustion in reaction motors. Thus, I have found that by arranging the azine in a reaction motor combustion chamber so that it is contacted by the first of an oxidizing agent, e.g. fuming nitric acid, introduced into the chamber spontaneous and instant flaming combustion is produced and the principal fuel is thereby instantly ignited. Ignition delay is thus negligible and smooth starting of the motor is obtained. Thus, a reaction propulsion method is provided which is both instantaneous in action and certain in character so that rocket power failures are reduced to a minimum.

The azines useful as hypergolic agents in my invention are azines of certain unsaturated aldehydes, e.g. furfuralazine and acroleinazine. These compounds are readily obtained by the condensation of the aldehydes with hydrazine. On stirring 2 moles of the liquid aldehyde into an aqueous solution of 1 mole of hydrazine at ordinary temperatures, the azine precipitates and is filtered and dried.

The hypergloic system of my invention is utilized in reaction motor combustion systems in any manner suitable to effect contact of the hypergolic agent with the first of the fuming nitric acid introduced into the combustion chamber. For example, a solution of the hypergolic agent is pumped into the combustion chamber immediately prior to pumping in the principal fuel using the same means for injection for both. Alternatively, the agent is applied in any suitable manner to the inner wall of the combustion chamber, for example, by blending it with a suitable carrier, e.g. nitrocellulose, so that it can be applied in to form of a film to the wall of the combustion chamber. When applied in this manner a suspension of equal weights of the hypergolic agent and the nitrocellulose dope may be used. Somewhat more or less than this proportion is also suitable but the proportion of hypergolic agent should not fall below about 10 percent based on the dope in order to be certain of instantaneous firing. Alternatively, the azine can be compressed with or without minor proportions of a binder into a rod or pellet located in the line of the entering stream of acid. It is an advantage of my system that no additional mechanical equipment need be added to the rocket and no change is required in any of its mechanical features. Thus, the hypergolic agent is introduced into the chamber in one of the manners indicated above and then the agent and entering stream of fuming nitric acid are contacted or brought together so that combustion of the agent occurs either in the presence of the liquid fuel which has been pumped, usually simultaneously with the acid, into the chamber or before the liquid fuel is pumped into the chamber.

In one method of performing the process of the present invention, a metal rod is located axially in the head of the combustion chamber and extends into the line of flow of the oxidizer from its orifice. The rod, e.g. a ¼ inch rod, is painted with a mixture of 50 percent of nitrocellulose lacquer and 50 percent of the hypergolic agent of the present invention. As soon as the pump delivers oxidizer to the combustion chamber it impinges on the hypergolic-nitrocellulose composition on the surface of the rod and immediate ignition occurs. By this time the principal fuel, for example, gasoline, is also impinging on the rod and is ignited as soon as it enters the combustion chamber.

The method of my invention will be further illustrated by reference to the accompanying drawing which is a schematic drawing of a rocket motor.

In the drawing the combustion chamber or rocket motor 11 carries in its head the threaded metal rod 12 bearing the hypergolic material 13 painted thereon. Rod 12 is arranged axially of combustion chamber 11. Fuel is supplied through line 14 controlled by valve 23 through orifice 15. Oxidizer is supplied through line 16 controlled by valve 24 and orifice 17. The orifices 15 and 17 are directed so that the stream of fuel and oxidizer impinge on rod 12. The turbine 18 is supplied with steam through line 19 which exhausts through line 20. Operation of the turbine 18 pumps fuel from tank 21 via line 14 to the combustion chamber and oxidizer from tank 22 via line 16 to the combustion chamber.

In operation, turbine 18 pumps fuel and oxidizer via lines 14 and 16 respectively through orifices 15 and 17 so that the streams meet and contact the hypergolic composition 13 on rod 12. Because of the instaneous flaming combustion by the oxidizer of the hypergolic composition, the principal fuel is also instantly ignited and the operation begins smoothly.

The ratio of oxidizer to fuel used will depend on the type of fuel and upon the strength of the acid oxidizer used, but in general the ratios should be such as to provide sufficient nitric acid to oxidize at least about 70 to 80 percent of the fuel. For example, a ratio of 275 parts of white fuming nitric acid to 100 parts of kerosene is satisfactory. The hypergolic agent is used in an amount sufficient to cause instantaneous combustion when contacted by the oxidizer. For example, as little as one gram to as much as ten or more pounds can be used.

The amount of hypergolic agent used does not depend on the total amount of fuel and oxidizer to be burned in the rocket motor but on the size of motor. The hypergolic agent is not continuously introduced with the fuel and oxidizer but is introduced before the rocket motor is operated. After ignition occurs and the rocket motor is in operation, no further quantities of hypergolic agent are required so long as the rocket motor continues to operate. Once it is shut off, however, a new supply of hypergolic agent is introduced before beginning operation again. Thus the amount of hypergolic agent required bears no relation to the quantities of fuel and oxidizer eventually consumed but is more properly related to the size of the rocket motor. In a small rocket motor, for example one inch in diameter and six inches in length, as little as one gram of hypergolic agent disposed in the interior of the motor may be sufficient when contacted by liquid oxidizer to effect instantaneous and flaming ignition. In a larger rocket proportionately larger quantities of hypergolic agent are used.

In operation of a reaction motor as shown in the drawing and having a total mass of about 50 pounds and a thrust of 1500 pounds, for example, about one pound of the hypergolic agent in admixture with an equal weight of a nitrocellulose carrier is applied to the metal rod and kerosene and white fuming nitric acid injected into the combustion chamber under a pressure of about 7 pounds per square inch and in a ratio of acid to kerosene of about 2.75 to 1 (5.72 pounds per second of nitric acid and 2.08 pounds per second of kerosene) to impinge on the agent on the rod and produce instantaneous flaming combustion.

In testing the hypergolic agents of my invention, about 0.5 ml. of white fuming nitric acid was placed in a glass thimble measuring 25 mm. in diameter and 40 mm. in height. One-half gram of the solid hypergolic agent was added by means of a spatula to the nitric acid. In each repetition of the test vigorous and instantaneous flaming occurred, indicating that my hypergolic system provides certain and instantaneous flaming combustion and can be utilized advantageously in reaction motor combustion systems to produce smooth starting.

I claim:

1. In the combustion of a liquid hydrocarbon fuel in a reaction motor combustion chamber, the method of instantly initiating the combustion of the liquid hydrocarbon fuel which comprises introducing an azine selected from the group consisting of furfuralazine and acroleinazine into the combustion chamber, contacting the azine with fuming nitric acid and introducing the liquid hydrocarbon fuel into the combustion chamber.

2. The method of claim 1 in which the azine is furfuralazine.

3. The method of claim 1 in which the azine is acroleinazine.

4. In the combustion of a liquid hydrocarbon fuel in a reaction motor combustion chamber, the method of instantly initiating the combustion of the liquid hydrocarbon fuel which comprises introducing an azine selected from the group consisting of furfuralazine and acroleinazine into the combustion chamber and contacting the azine with fuming nitric acid in close proximity to the liquid hydrocarbon fuel whereby instant combustion of the fuel is obtained.

5. The method of claim 4 in which the azine is furfuralazine.

6. The method of claim 4 in which the azine is acroleinazine.

7. The method of providing a reaction mixture suitable for use in instantly initiating the combustion of liquid hydrocarbon fuels in a reaction motor combustion chamber, which comprises contacting in the chamber an azine selected from the group consisting of furfuralazine and acroleinazine with fuming nitric acid.

8. The method of claim 7 in which the azine is furfuralazine.

9. The method of claim 7 in which the azine is acroleinazine.

No references cited.